US012592520B2

(12) United States Patent
Chen et al.

(10) Patent No.: US 12,592,520 B2
(45) Date of Patent: Mar. 31, 2026

(54) INSERT FOR A CONNECTOR

(71) Applicant: HARTING Electric GmbH & Co. KG, Espelkamp (DE)

(72) Inventors: Yongjun Chen, Zhuhai (CN); Yingtao Wang, Zhuhai (CN)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 309 days.

(21) Appl. No.: 18/264,729

(22) PCT Filed: Jan. 31, 2022

(86) PCT No.: PCT/DE2022/100086

§ 371 (c)(1),
(2) Date: Aug. 8, 2023

(87) PCT Pub. No.: WO2022/171242

PCT Pub. Date: Aug. 18, 2022

(65) Prior Publication Data

US 2024/0113476 A1 Apr. 4, 2024

(30) Foreign Application Priority Data

Feb. 9, 2021 (CN) ......................... 202110177708.4

(51) Int. Cl.
*H01R 13/652* (2006.01)
*H01R 13/436* (2006.01)

(52) U.S. Cl.
CPC ....... *H01R 13/652* (2013.01); *H01R 13/4367* (2013.01)

(58) Field of Classification Search
CPC .......................... H01R 13/652; H01R 13/4367
See application file for complete search history.

(56) References Cited

U.S. PATENT DOCUMENTS 3,689,866 A * 9/1972 Kelly .................. H01R 13/465 439/586
4,902,092 A * 2/1990 Grandy .................. H01R 25/00 439/502

(Continued)

FOREIGN PATENT DOCUMENTS

AU 2013216701 A1 * 8/2014 ........... H01R 12/724
CN 108521037 A 9/2018

(Continued)

OTHER PUBLICATIONS

Machine translation of DE102017108162 (Year: 2018).*

(Continued)

*Primary Examiner* — Tulsidas C Patel
*Assistant Examiner* — Thomas K Quigley
(74) *Attorney, Agent, or Firm* — Seed Intellectual Property Law Group LLP

(57) ABSTRACT

An insert for a connector is provided having: an insert housing, wherein a cavity of the insert housing has multiple connection-accommodating holes for accommodating multiple connections, and wherein the multiple connections comprise at least one protective grounding connection; a holding plate, which is attached to a connection side of the insert housing in order to hold the multiple connections in the cavity; and a protective grounding plate, which serves for electrical contact with the protective grounding connection. The insert can accommodate more connections, whereby a high-density connector is provided, wherein power connections and protective grounding connections of the same type can be used in order for quick assembly and disassembly to be realized, whereby it is also possible for customers to replace the connections according to actual use.

13 Claims, 5 Drawing Sheets

(56) References Cited

U.S. PATENT DOCUMENTS

| | | | | | |
|---|---|---|---|---|---|
| 4,981,438 | A * | 1/1991 | Bekhiet | H02B 1/202 | 439/502 |
| 5,449,302 | A * | 9/1995 | Yarbrough | H01R 13/645 | 439/95 |
| 5,509,823 | A * | 4/1996 | Harting | H01R 12/57 | 439/607.17 |
| 5,697,806 | A * | 12/1997 | Whiteman, Jr. | H01R 31/00 | 439/417 |
| 6,004,162 | A * | 12/1999 | Harting | H01R 13/518 | 439/716 |
| 6,814,625 | B2 * | 11/2004 | Richmond | H01R 13/6453 | 439/157 |
| 7,001,222 | B2 * | 2/2006 | Mazzullo | H01R 25/003 | 439/695 |
| 7,413,478 | B2 * | 8/2008 | Kleinschmidt | H01R 13/652 | 439/737 |
| 10,348,027 | B2 * | 7/2019 | Zhao | H01R 12/724 | |
| 11,336,047 | B2 * | 5/2022 | Kliever | H01R 13/111 | |
| 11,705,672 | B2 * | 7/2023 | Iphoefer | H01R 13/4367 | 439/108 |
| 11,764,495 | B2 * | 9/2023 | Schlegel | H01R 13/6583 | 439/108 |
| 11,881,649 | B2 * | 1/2024 | Kliever | H01R 4/60 | |
| 2002/0146931 | A1 * | 10/2002 | Richmond | H01R 13/6453 | 439/488 |
| 2013/0029525 | A1 * | 1/2013 | Bauerle | H01R 9/0527 | 439/607.41 |
| 2016/0111816 | A1 * | 4/2016 | Walker | F04D 25/0693 | 29/854 |
| 2019/0148886 | A1 * | 5/2019 | Christen | H01R 29/00 | 439/13 |
| 2022/0052491 | A1 * | 2/2022 | Iphoefer | H01R 13/655 | |
| 2023/0135279 | A1 * | 5/2023 | Wang | H01R 13/5213 | 439/271 |

FOREIGN PATENT DOCUMENTS

| | | | | |
|---|---|---|---|---|
| DE | 102016121966 | A1 * | 5/2018 | H01R 24/28 |
| DE | 102017108162 | A1 * | 10/2018 | H01R 13/6597 |
| DE | 102021108154 | A1 * | 10/2022 | H01R 13/652 |
| EP | 3312940 | A1 * | 4/2018 | H01R 13/514 |
| WO | WO-2018162136 | A1 * | 9/2018 | H01R 4/646 |
| WO | WO 2020051842 | A1 | 3/2020 | |

OTHER PUBLICATIONS

International Search Report and Written Opinion, mailed May 16, 2022 for International Patent Application No. PCT/DE2022/100086. (11 pages) (with English translation of International Search Report).

International Preliminary Report on Patentability, dated Aug. 15, 2023, for International Patent Application No. PCT/DE2022/100086. (7 pages).

* cited by examiner

INSERT FOR A CONNECTOR

BACKGROUND

Technical Field

Embodiments of the present disclosure relate to a connector, such as a crimp connector.

Description of the Related Art

Existing connectors, such as, for example, crimp connectors, accommodate in the interior multiple connections, comprising power connections, protective grounding (PE) connections, and coding connections. Owing to the space limitations and the relatively large protective grounding connections, relatively few connections can be accommodated in the plug-in connector. Since the type of the PE connection used normally differs from that of the power connection, it is additionally necessary for technicians to use a screw to fasten the PE connection, which leads to a very laborious installation.

BRIEF SUMMARY

Embodiments of the present disclosure provide an insert for a connector, wherein the insert can accommodate more connections, whereby a high-density connector is provided, wherein power connections and protective grounding connections of the same type can be used in order for quick assembly and disassembly to be realized, whereby it is also possible for customers to replace the connections according to actual use.

In some embodiments, an insert for a connector is provided, said insert comprising: an insert housing, wherein a cavity of the insert housing has multiple connection-accommodating holes for accommodating multiple connections, and wherein the multiple connections comprise at least one protective grounding connection; a holding plate, which is attached to the connection side of the insert housing in order to hold the multiple connections in the cavity; and a protective grounding plate, which serves for electrical contact with the protective grounding connection.

In an advantageous embodiment, the multiple connections furthermore comprise power connections and coding connections, wherein the power connections and the protective grounding connections are the same type of connection.

A particular advantage is to simplify the installation of the protective grounding connections in the insert housing through additional provision of the protective grounding plate, whereby the power connections can be used as protective grounding connections. Since normal power connections can be used as grounding protection connections, relatively more connections can be accommodated in the insert housing.

Advantageously, the protective grounding plate may be elastic and produced from metal material. In some embodiments, the metal material may be copper or a copper alloy. Advantageously, the protective grounding plate may be integrally formed from metal material.

In an advantageous embodiment, the protective grounding plate comprises a first arm and a second arm and also an L-shaped connecting portion which connects the first arm and the second arm, wherein a plane in which the first arm is situated and a plane in which the second arm is situated are oriented vertically with respect to one another. Advantageously, the first arm and the second arm may each be in the form of a flat elastic piece.

Advantageously, the first arm may have a fixed end and a movable end, wherein the inner side of the movable end of the first arm has a projection. The second arm may have a fixed end and a movable end, and wherein the movable end of the second arm has a screw hole, and wherein a sawtooth formation is formed on the two sides of the second arm. The fixed ends of the first arm and the second arm are each integrally formed on the L-shaped connecting portion, and are preferably each integrally formed on the two ends of the L-shaped connecting portion.

Advantageously, the L-shaped connecting portion may have a reinforcement rib in order to improve the strength of the protective grounding plate and to prevent excessive deformation. The reinforcement rib may be formed on the outer surface and/or the inner surface of the L-shaped connecting portion.

In an advantageous embodiment, the multiple connection-accommodating holes comprise at least one protective grounding connection-accommodating hole for simultaneously accommodating the protective grounding connections and the protective grounding plate, and wherein the protective grounding plate comprises a slot into which the second arm of the protective grounding plate is inserted.

Advantageously, the protective grounding connection-accommodating hole may comprise a first accommodating portion for accommodating the protective grounding connection, wherein the shape of the first accommodating portion is substantially the same as the shape of the other connection-accommodating holes, the first accommodating portion furthermore being used for accommodating the first arm of the protective grounding plate, and a second accommodating portion for accommodating the second arm of the protective grounding plate, specifically a slot.

Advantageously, the protective grounding connection-accommodating holes may be distributed on a side wall which faces toward the insert housing.

In an advantageous embodiment, the slot is provided in a side wall of the insert housing, wherein the side wall has an opening in order to expose at least the screw hole of the second arm, so that a screw can be screwed in. In this way, an electrical connection between the protective grounding plate and the screw is established.

Advantageously, the slot in the side wall may extend from the connection side to the plug-in side, whereby the second arm of the protective grounding plate may be inserted from the connection side.

In an advantageous embodiment, the opening at the side wall extends from the connection side of the insert housing to the plug-in side, wherein the opening is of U-shaped form, so that the full cross section of the slot, when viewed from the connection side, is not of closed form. In other words, on the two sides of the opening of the side wall, there are formed along the plug-in direction in each case two slot portions which are in each case used for accommodating the two sides of the second arm, wherein the two slots portions together form the slot. Then, as soon as the second arm is inserted into the slot, the largest part of the second arm, including the screw hole, is exposed.

In other embodiments, the opening at the side wall does not start from the connection side of the insert housing, wherein the opening may be formed to be rectangular, square, circular, oval, etc., so that only a small part of the second arm, including the screw hole, is exposed or even only the screw hole is exposed.

In some embodiments, a plane in which the opening is situated is recessed relative to the outer surface of the side wall. In this way, an installation space for the screw can be provided.

In an advantageous embodiment, when the second arm of the protective grounding plate has been inserted into the slot, the sawtooth formation penetrates into the side wall of the slot in order for the protective grounding plate to be fastened in the insert housing, wherein the projection of the first arm can come into contact with the collar of the protective grounding connection.

Advantageously, the insert housing may be produced from plastic, wherein the width of the slot is slightly smaller than the width of the second arm, in order for a press fit to be realized between the second arm and the slot.

Advantageously, the first arm may be accommodated in the first accommodating portion of the protective grounding connection-accommodating hole, wherein the outer side of the first arm bears against the inner side of the hole and the inner side faces toward the accommodated section, whereby the projection of the first arm comes into contact with the collar of the connection in order to establish an electrical connection between the protective grounding connection and the protective grounding plate.

In an advantageous embodiment, the number of power connections comprised by the connections is 7 and the number of protective grounding connections comprised by the connections is 1. Preferably, the multiple connections furthermore comprise at least one coding connection.

Advantageously, different numbers of the connections may be accommodated in the insert through the spatial arrangement.

BRIEF DESCRIPTION OF THE SEVERAL VIEWS OF THE DRAWINGS

Embodiments of the present invention are illustrated in the figures and discussed in more detail below.

DETAILED DESCRIPTION

The present invention is explained in more detail below in conjunction with embodiments and with reference to the figures. In the description, identical or similar reference signs indicate the same or similar components. The following explanations of the embodiments of the present invention in conjunction with the figures are used for explaining the overall concept of the present invention and are not intended to be understood as limiting the present invention.

Figure 1:
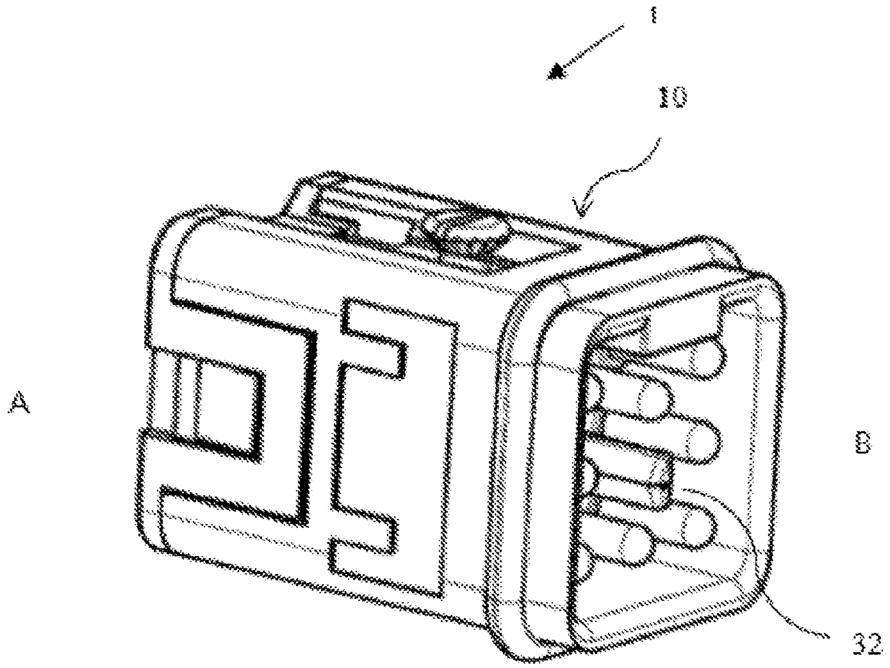
FIG. 1 shows a perspective view of an insert in one embodiment of the present invention, wherein a male connection is accommodated in the insert.

FIG. 1 shows a perspective view of an insert for a connector in one embodiment of the present invention. The connector is implemented in particular as a crimp connector, comprising a cover (also referred to as outer shell and not illustrated) and an insert 1 which is accommodated in the cover. As illustrated in FIG. 1, the insert 1 comprises an insert housing 10 which is produced from plastic. The insert housing 10 is of cuboidal form and has a connection side A and a plug-in side B. The direction from the connection side A to the plug-in side B is referred to as plug-in direction. The insert housing 10 has four side surfaces oriented parallel to one another, specifically a top side and a bottom side along with a front side and a rear side, which, for reasons of clarity, are not marked. The cavity of the insert housing 10 has in the interior multiple connection-accommodating holes (see FIG. 4), 9 holes being illustrated in FIG. 4. However, the number of holes is not limited thereto. Each connection-accommodating hole has in each case one connection. That is to say, multiple connections are accommodated in the insert housing 10, the number of these provided being 9 in FIG. 4. However, the number of connections is not limited thereto. Here, the connection is a plug-in connection. Thus, the insert 1 is a plug-in insert, while the connector is a plug-in connector. The connection comprises a power connection 30, a protective grounding (PE) connection 31 (hereinafter written in shortened form as PE connection) and a coding connection 32. Here, the power connection and the PE connection may be connections of the same type, such as, for example, a standard HAN E crimp connection with a cross-sectional area of 4.0 $mm^2$. The multiple connections comprise at least one PE connection, for example, one or two PE connections. Accordingly, the connection-accommodating holes comprise a power connection-accommodating hole 20, a protective grounding (PE) connection-accommodating hole 21, and a coding connection-accommodating hole 22.

Figure 2:
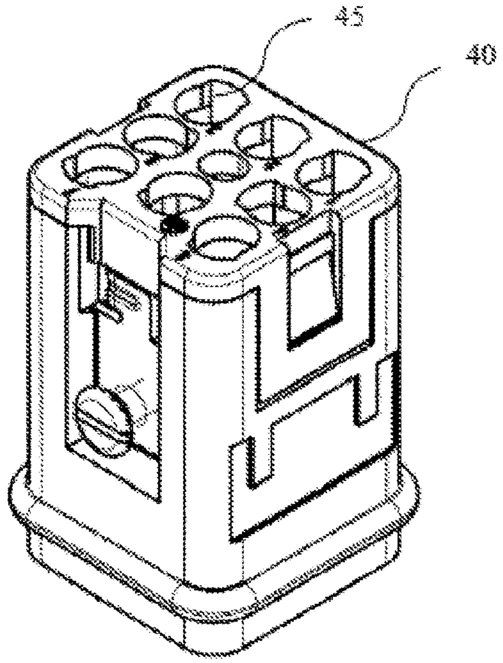
FIG. 2 shows a perspective view of the insert as per FIG. 1 rotated through 90°.

FIG. 2 shows a perspective view of the insert as per FIG. 1 rotated through 90°, wherein the insert 1 comprises a holding plate 40 which is connected in particular to the connection side A of the insert housing 10. The holding plate 40 covers the connection side A and has multiple holes 45 which correspond to the connection-accommodating holes 20, wherein the connections 30, 31, 32 can be inserted through the holes 45 into the connection-accommodating holes 20 from the connection side A along the plug-in direction.

Figure 3:
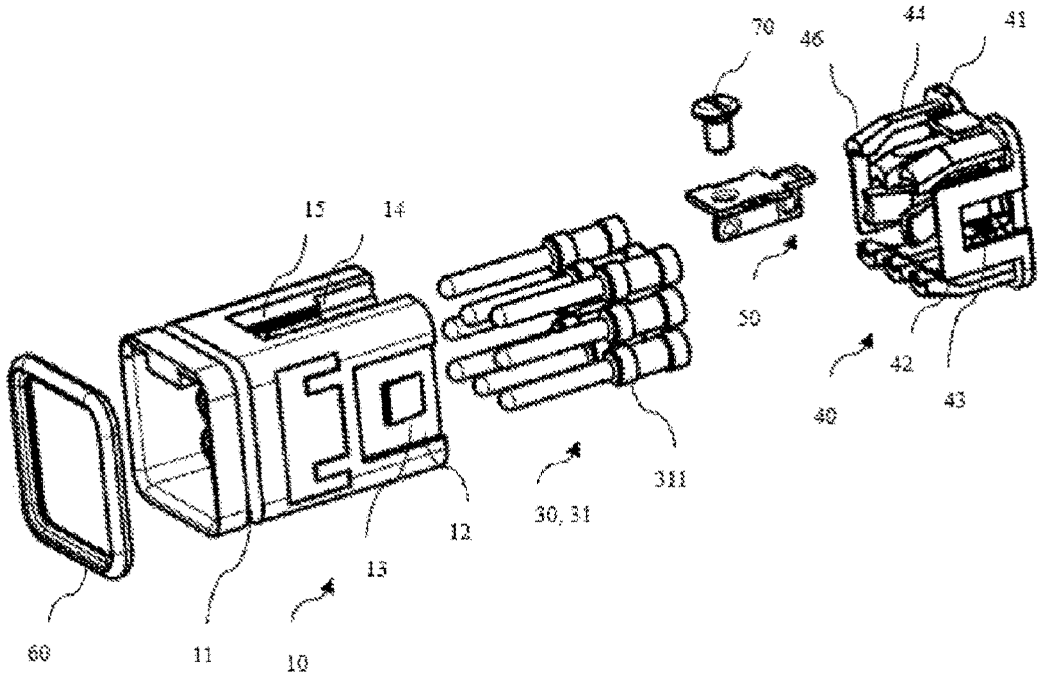
FIG. 3 shows an exploded view of the insert as per FIG. 1.

FIG. 3 shows an exploded view of the insert as per FIG. 1. The main components of the insert are explained in conjunction with FIG. 3.

The holding plate 40 comprises a bottom plate 41, a locking element 42 which extends from two mutually oppositely situated sides (the front and rear sides as per FIG. 3) along the plug-in direction and has a window 43, and multiple locking arms 44 which extend from the inner surface of the bottom plate 41 along the plug-in direction and extend in particular from the edge of each hole 45. In other words, each hole 45 is provided with a locking arm 44. The locking arm 44 has a fixed end and a movable end, wherein the fixed end is integrally formed on the bottom plate 41, and a movable end, the front end of which is formed with a bending portion 46. Provided on both sides (the front and rear sides) of the insert housing 10 in a manner corresponding to the locking element 42 of the holding plate 40 are in each case latching recesses 12 which are recessed relative to the outer surface of the front and rear side walls, and wherein a locking nose 13 is arranged on the bottom side of the latching recesses. When the holding plate 40 is fastened to the insert housing 10, as illustrated in FIG. 1, the locking nose 13 projects into the window 43 of the locking element 42 in order to fasten the holding plate 40 to the insert housing 10. Furthermore, a peripheral groove 11 for accommodating a sealing element 60 is formed at an outer periphery, facing toward the plug-in side B, of the insert housing 10.

Figure 6A:
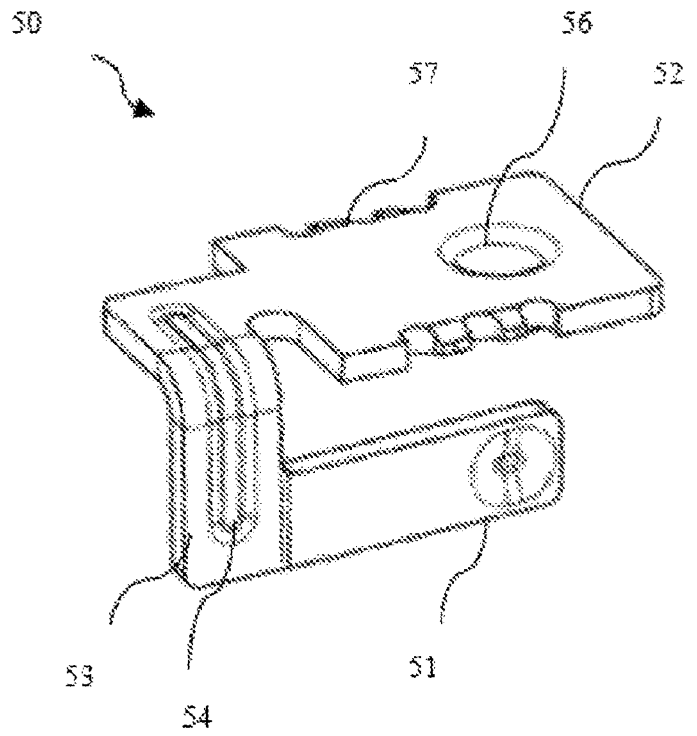
FIGS. 6*a* and 6*b* show different perspective views of the protective grounding plate.
Figure 6B:
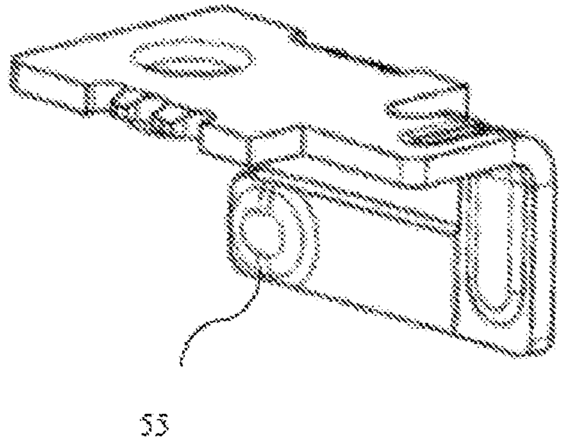

The specific structure of the protective grounding (PE) plate 50 (hereinafter written in shortened form as PE plate) is illustrated in FIGS. 6*a* and 6*b*. The PE plate consists of a metal material such as copper or a copper alloy and may be integrally formed, wherein the PE plate may be elastic. As illustrated in FIGS. 6*a* and 6*b*, the PE plate 50 comprises a first arm 51 and a second arm 52, wherein the two arms are each in the form of a flat elastic metal sheet, and wherein a plane in which the first arm 51 is situated and a plane in which the second arm 52 is situated are oriented vertically with respect to one another. The two arms 51, 52 each comprise a fixed end and a movable end. The respective fixed ends of the arms are connected to the connecting portion 53. The fixed ends of the two arms may be integrally formed on the connecting portion 53. The connecting portion is of substantially L-shaped form, wherein the fixed ends of the two arms are each integrally formed on the two ends of the L shape, wherein a reinforcement rib 54 is formed on the inner and/or outer surface of the connecting portion in order to improve the strength of the connecting portion and to avoid excessive deformation. The inner side of the movable end of the first arm 51 has a projection 55, while the movable end of the second arm 52 has a screw hole 56, wherein, on the two sides of the second arm 52, specifically on the longitudinal sides (the front and rear sides as per FIG. 6*a*), there is formed a sawtooth formation 57 which is situated approximately between the fixed end and the screw hole of the second arm.

Below, an explanation is given in conjunction with FIGS. 4 and 5 as to how the holding plate 40 holds the connections, specifically the power connections 30 and the PE connections 31, in the connection-accommodating holes 20 and the PE connection-accommodating holes 21 and how an electrical connection between the PE plate 50 and the PE connections 31 is established.

Figure 5:
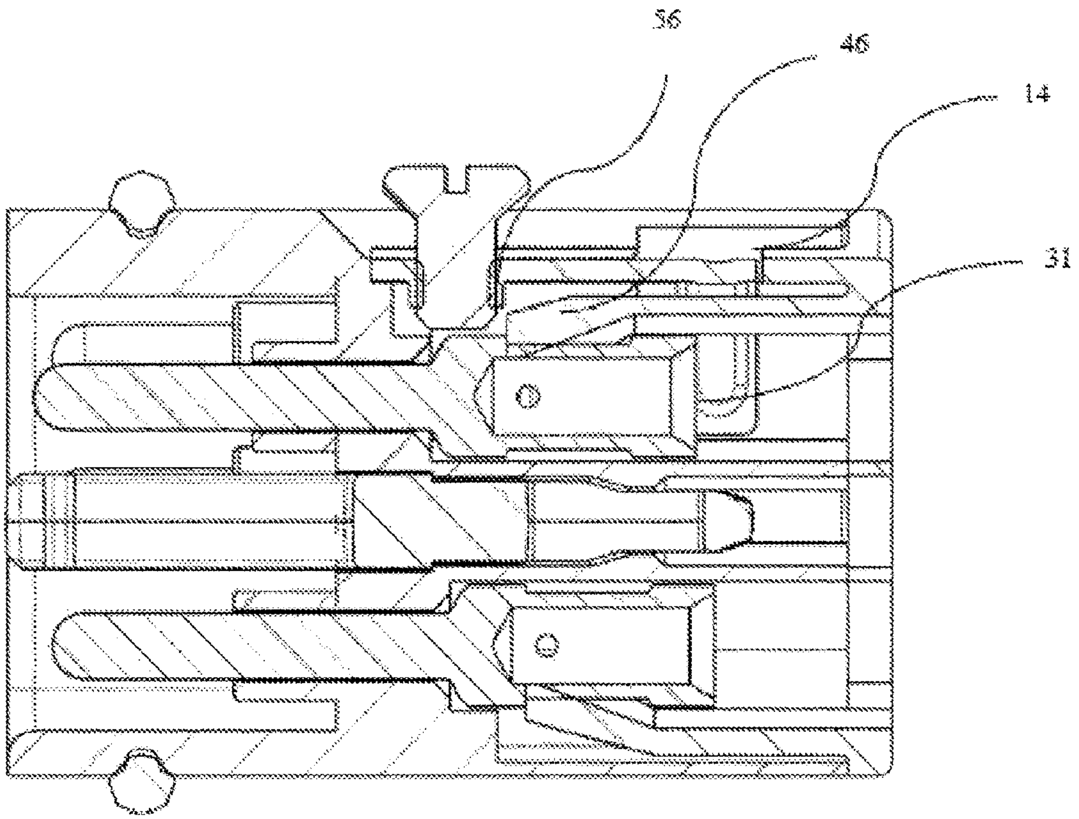
FIG. 5 shows a sectional view of the insert as per FIG. 1.

As illustrated in FIG. 5, the power connection 30 is firstly inserted into the hole 45 of the holding plate 40 and is then inserted together with the corresponding locking arm 44 of the holding plate 40 into the corresponding connection-accommodating hole 20, wherein, by way of pressing of the hole wall of the accommodating hole 20, the bending portion 46 of the locking arm 44 bears against the power connection, whereby the connection is kept in the accommodating hole. Analogously, the PE connection 31 is firstly inserted into the hole 45 of the holding plate 40 and is then inserted together with the corresponding locking arm 44 of the holding plate 40 into the corresponding PE connection-accommodating hole 21, wherein, by way of pressure of the wall of the hole, the bending portion 46 of the locking arm 44 bears against the PE connection, whereby the connection is held in the accommodating hole.

Figure 4:
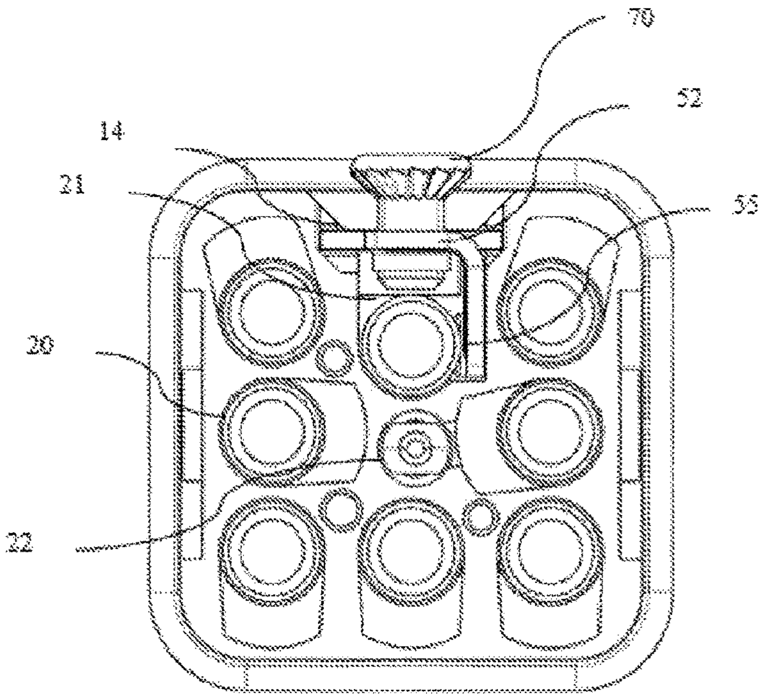
FIG. 4 shows a view from below of the insert as per FIG. 1, wherein the holding plate has been removed.

As illustrated in FIG. 4, the PE connection-accommodating hole 21 differs from the other power connection-accommodating holes 20. The PE connection-accommodating holes 21 are arranged close to the side wall (the upper side wall as per FIG. 4) of the insert housing. The PE connection-accommodating hole 21 comprises a first accommodating portion for accommodating the PE connection 31, which, for reasons of clarity, is not illustrated. The shape of the first accommodating portion is substantially the same as the shape of the other connection-accommodating holes, specifically the shape of the power connection-accommodating holes, wherein the first accommodating portion is used to accommodate, in addition to the PE connection 31, also the first arm 51 of the PE plate 50. The PE connection-accommodating hole 21 furthermore comprises a second accommodating portion for accommodating the second arm 52 of the PE plate 50, specifically a slot 14. The slot 14 is arranged at the side wall of the insert housing 10, specifically at the upper side wall, and extends from the connection side A to the plug-in side B. The side wall has an opening 15 which extends from the connection side A to the plug-in side B and which is of U-shaped form. In this way, the cross section of the slot 14, when viewed from the connection side A, is not of closed form. In other words, on the two sides of the U-shaped opening 15 at the side wall, there are formed in each case two slot portions which together form the slot, wherein the two slot portions are separated by the opening 15. The opening 15 may be recessed relative to the outer surface of the side wall where the opening is situated. Although it is the case that, in the figures (FIGS. 1 to 7) of the present invention, the opening 15 is arranged in such a way that the inserted second arm 52 is largely exposed, a person skilled in the art in this field can understand that the opening does not begin from the connection side of the insert housing, but rather is arranged in the middle part of the side wall. For example, the opening is formed to be square, rectangular, oval, circular, etc. In this way, only a small part of the second arm is exposed. However, the screw hole of the second arm is at any rate to be exposed in order for the screw to be screwed in from the outside.

Before the holding plate 40 is fastened to the insert housing 10, the PE plate 50 is firstly installed in the insert housing 10, in particular in the PE connection-accommodating hole 21. During the insertion process, the second arm 52 is inserted into the slot along the plug-in direction, wherein the sawtooth formations on the two sides penetrate into the inner walls on both sides of the slot in order for the second arm to be fastened in the slot. The width of the slot may be slightly smaller than the width of the second arm, in order for a press fit to be realized between the second arm and the slot. The first arm 51, which is oriented vertically with respect to the second arm 52, bears against the inner wall of the PE connection-accommodating hole 21. After the PE connection 31 has been inserted into the PE connection-accommodating hole 21, the projection 55 on the inner side of the movable end of the first arm 51 comes into contact with the PE connection 31, in particular with its collar 311 (FIG. 3), whereby an electrical connection between the PE connection 31 and the PE plate 50 is established. A screw 70 is screwed into the screw hole 56 so that the metal cover (not illustrated) comes into electrical contact with the PE plate 50, in particular with the second arm 52, whereby an electrical connection between the cover and the PE plate 50 is established. A grounding connection between the PE connection 31 and the cover is established at the end.

Figure 7:
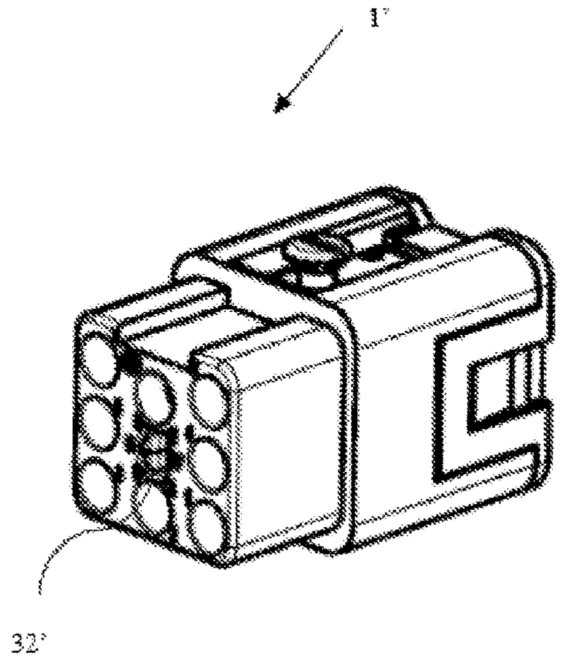
FIG. 7 shows a perspective view of an insert in another embodiment of the present invention, wherein socket connections are accommodated in the insert.
Figure 8:
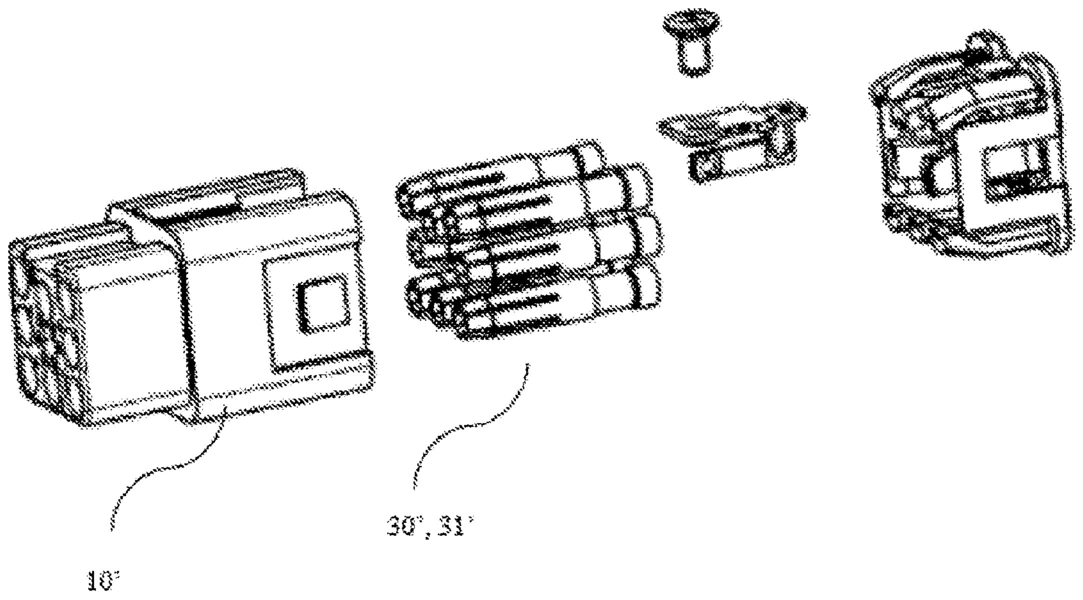
FIG. 8 shows an exploded view of the insert as per FIG. 7.

FIGS. 7 and 8 respectively show a perspective view and an exploded view of an insert 1' in another embodiment of the present invention. The insert 1' is substantially the same as the insert 1 as per FIG. 1, and identical components acquire the same reference signs. The main difference is that the insert housing 10' accommodates the socket connections 30', 31', 32' in the interior, and consequently the insert is referred to as a socket insert, and a connector which uses the insert becomes a socket connector.

For a person ordinarily skilled in the art in this field, it is clear that the present invention is not limited to the details of the illustrated embodiments. Furthermore, the present disclosure may be realized by other embodiments. For example, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An insert for a connector, comprising:

an insert housing, wherein an interior of the insert housing has multiple connection-accommodating holes for accommodating multiple connections, and wherein the multiple connections comprise at least one protective grounding connection;

a holding plate attached to a connection side of the insert housing in order to hold the multiple connections in the interior of the insert housing; and a protective grounding plate, which serves for electrical contact with the at least one protective grounding connection when received in the insert housing, wherein the protective grounding plate comprises a first arm and a second arm and an L-shaped connecting portion which connects the first arm and the second arm, and wherein a plane in which the first arm is situated and a plane in which the second arm is situated are oriented perpendicularly with respect to one another, and wherein the first arm has a fixed end and a movable end, and wherein an inner side of the movable end of the first arm has a projection, and wherein the second arm has a fixed end and a movable end, and wherein the movable end of the second arm has a screw hole.

2. The insert for a connector according to claim 1, wherein the multiple connections further comprise power connections and coding connections, and wherein the power connections and the at least one protective grounding connection each have the same physical configuration.

3. The insert for a connector according to claim 1, wherein the protective grounding plate is elastic and is produced from metal material.

4. The insert for a connector according to claim 1, wherein a respective sawtooth formation is formed on each of opposing sides of the second arm.

5. The insert for a connector according to claim 1, wherein the L-shaped connecting portion has a reinforcement rib.

6. The insert for a connector according to claim 4, wherein the multiple connection-accommodating holes comprise at least one protective grounding connection-accommodating hole for simultaneously accommodating the at least one protective grounding connection and the protective grounding plate, and wherein the insert housing further comprises a slot into which the second arm of the protective grounding plate is inserted.

7. The insert for a connector according to claim 6, wherein the slot is provided in a side wall of the insert housing, and wherein the side wall has an opening in order to expose at least the screw hole of the second arm, so that a screw can be screwed in.

8. The insert for a connector according to claim 7, wherein, when the second arm of the protective grounding plate has been inserted into the slot, the sawtooth formations penetrate into portions of the insert housing that define the slot in order for the protective grounding plate to be fastened to the insert housing; and wherein the projection of the first arm can come into contact with a collar of the at least one protective grounding connection when received in the insert housing.

9. The insert for a connector according to claim 2, wherein the number of power connections comprised by the connections is seven and the number of protective grounding connections comprised by the connections is one.

10. An insert for a connector, comprising:

an insert housing, wherein an interior of the insert housing has multiple connection-accommodating holes for accommodating multiple connections, and wherein the multiple connections comprise at least one protective grounding connection;

a holding plate attached to a connection side of the insert housing in order to hold the multiple connections in the interior of the insert housing; and a protective grounding plate, which serves for electrical contact with the at least one protective grounding connection when received in the insert housing, wherein the protective grounding plate comprises a first arm and a second arm and an L-shaped connecting portion which connects the first arm and the second arm, and wherein a plane in which the first arm is situated and a plane in which the second arm is situated are oriented perpendicularly with respect to one another, wherein the insert housing further comprises a slot provided in a side wall of the insert housing into which the second arm of the protective grounding plate is insertably received, and wherein the side wall has an opening in order to expose a screw hole of the second arm of the protective grounding plate to receive a screw.

11. The insert for a connector according to claim 10 wherein the first arm of the protective grounding plate has a fixed end and a movable end, and wherein an inner side of the movable end of the first arm has a projection, and wherein the second arm of the protective grounding plate has a fixed end and a movable end, and wherein the movable end of the second arm has the screw hole.

12. The insert for a connector according to claim 10 wherein, when the second arm of the protective grounding plate has been inserted into the slot, sawtooth formations on the second arm of the protective grounding plate penetrate into portions of the insert housing that define the slot in order for the protective grounding plate to be fastened to the insert housing.

13. The insert for a connector according to claim 10 wherein the first arm of the protective grounding plate includes a projection that is configured to come into contact with a collar of the at least one protective grounding connection when received in the insert housing.

* * * * *